United States Patent
Epstein et al.

(10) Patent No.: US 8,612,226 B1
(45) Date of Patent: Dec. 17, 2013

(54) DETERMINING ADVERTISEMENTS BASED ON VERBAL INPUTS TO APPLICATIONS ON A COMPUTING DEVICE

(71) Applicant: Google Inc., Mountain View, CA (US)

(72) Inventors: Mark Edward Epstein, Katonay, NY (US); Pedro J. Moreno Mengibar, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/751,700

(22) Filed: Jan. 28, 2013

(51) Int. Cl.
 *G10L 15/22* (2006.01)
(52) U.S. Cl.
 USPC ........ 704/251; 705/14.3; 705/14.5; 705/14.6; 705/14.7
(58) Field of Classification Search
 USPC .............. 704/251; 705/14, 4, 14.5, 14.6, 14.7
 See application file for complete search history.

(56) References Cited

U.S. PATENT DOCUMENTS

| | | | | |
|---|---|---|---|---|
| 2002/0051521 | A1* | 5/2002 | Patrick | 379/88.01 |
| 2005/0010641 | A1* | 1/2005 | Staack | 709/206 |
| 2006/0206479 | A1* | 9/2006 | Mason | 707/5 |
| 2006/0212897 | A1* | 9/2006 | Li et al. | 725/32 |
| 2007/0078709 | A1* | 4/2007 | Rajaram | 705/14 |
| 2007/0174258 | A1* | 7/2007 | Jones et al. | 707/3 |
| 2007/0198339 | A1* | 8/2007 | Shen et al. | 705/14 |
| 2008/0140529 | A1* | 6/2008 | Agarwal et al. | 705/14 |
| 2008/0201219 | A1* | 8/2008 | Broder et al. | 705/14 |
| 2008/0275861 | A1* | 11/2008 | Baluja et al. | 707/5 |
| 2009/0006375 | A1* | 1/2009 | Lax et al. | 707/5 |
| 2009/0076917 | A1* | 3/2009 | Jablokov et al. | 705/14 |
| 2010/0086107 | A1 | 4/2010 | Tzruya | |
| 2010/0169091 | A1* | 7/2010 | Zurek et al. | 704/235 |
| 2011/0302035 | A1* | 12/2011 | Stasio | 705/14.61 |
| 2011/0313860 | A1* | 12/2011 | Pan | 705/14.58 |
| 2011/0320273 | A1* | 12/2011 | Miranda-Steiner | 705/14.49 |

* cited by examiner

*Primary Examiner* — Jialong He
(74) *Attorney, Agent, or Firm* — McDonnell Boehnen Hulbert & Bergoff LLP (57) ABSTRACT

The present disclosure provides methods operable by computing device having one or more applications configured to perform functions based on a received verbal input. The method may comprise receiving a verbal input, obtaining one or more textual phrases corresponding to the received verbal input, and providing the one or more textual phrases to an appropriate application on the computing device. The method may further comprise accumulating data on the one or more textual phrases. The data comprises at least a count of a number of times a particular textual phrase is obtained based on a given received verbal input. Based on the count exceeding a threshold, the method may further comprise providing a query corresponding to the textual phrase, where the query is usable to search an advertisement database for one or more advertisements relating to the textual phrase.

18 Claims, 6 Drawing Sheets

DETERMINING ADVERTISEMENTS BASED ON VERBAL INPUTS TO APPLICATIONS ON A COMPUTING DEVICE

BACKGROUND

Computing devices such as personal computers, laptop computers, tablet computers, cellular phones, among many other types of computing devices, are increasingly prevalent in numerous aspects of modern life. As computers become progressively more integrated with users' everyday life, the convenience, efficiency, and intuitiveness of the user interfaces by which users interact with computing devices may become progressively more important.

A user interface may include various combinations of hardware and software which enable the user to, among other things, interact with a computing device. One example of a modern user interface is "voice control" that may allow a user to provide speech data to a computing device in order to recognize verbal inputs. The data may be received, translated into text, and processed by the computing device, and may ultimately be used by the computing device as a basis for executing certain computing functions.

Displaying advertisements on such computing devices has become increasingly prevalent as well. Computing devices with a small form factor have less "screen real estate" than computing devices with large displays. Advertisers may desire that their advertisements be relevant regardless of the types of devices on which they are displayed.

SUMMARY

In one aspect, a method is described. The method may comprise receiving by a computing device, a verbal input, wherein the computing device includes one or more applications configured to execute on the computing device and to perform functions based on the received input, and wherein the verbal input is in response to a request by an application executing on the computing device. The method may further comprise obtaining one or more textual phrases corresponding to the received verbal input. The method may further comprise providing the one or more textual phrases to an appropriate application on the computing device. The method may further comprise accumulating data on the one or more textual phrases. The data may comprise at least a count of a number of times a particular textual phrase is obtained based on a given received verbal input, and the data is representative of all textual phrases provided to the one or more applications on the computing device. Based on the count of a given textual phrase exceeding a threshold, the method may further comprise providing a query corresponding to the textual phrase, wherein the query is usable to search an advertisement database for one or more advertisements relating to the textual phrase.

In another embodiment, a computing device is described. The computing device may include at least one processor and data storage comprising program logic executable by the at least one processor to perform functions. The functions may comprise receiving by the computing device, a verbal input, wherein the computing device includes one or more applications configured to execute on the computing device and to perform functions based on the received input, and wherein the verbal input is in response to a request by an application executing on the computing device. The functions may further comprise obtaining one or more textual phrases corresponding to the received verbal input. The functions may further comprise providing the one or more textual phrases to an appropriate application on the computing device. The functions may further comprise accumulating data on the one or more textual phrases. The data may comprise at least a count of a number of times a particular textual phrase is obtained based on a given received verbal input, and the data is representative of all textual phrases provided to the one or more applications on the computing device. Based on the count of a given textual phrase exceeding a threshold, the functions may further comprise providing a query corresponding to the textual phrase, wherein the query is usable to search an advertisement database for one or more advertisements relating to the textual phrase.

In yet another aspect, a non-transitory computer readable memory having stored therein instructions executable by a computing device to cause the computing device to perform functions is described. The functions may comprise receiving by the computing device, a verbal input, wherein the computing device includes one or more applications configured to execute on the computing device and to perform functions based on the received input, and wherein the verbal input is in response to a request by an application executing on the computing device. The functions may further comprise obtaining one or more textual phrases corresponding to the received verbal input. The functions may further comprise providing the one or more textual phrases to an appropriate application on the computing device. The functions may further comprise accumulating data on the one or more textual phrases. The data may comprise at least a count of a number of times a particular textual phrase is obtained based on a given received verbal input, and the data is representative of all textual phrases provided to the one or more applications on the computing device. Based on the count of a given textual phrase exceeding a threshold, the functions may further comprise providing a query corresponding to the textual phrase, wherein the query is usable to search an advertisement database for one or more advertisements relating to the textual phrase.

These as well as other aspects, advantages, and alternatives, will become apparent to those of ordinary skill in the art by reading the following detailed description, with reference where appropriate to the accompanying drawings.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

In one embodiment, advertisements served on computing devices may be biased based on verbal inputs to such computing devices. A computing device may use "voice control" to process speech data in order to recognize verbal inputs. The data may be received, translated into text, and processed by the computing device, and may be used by the computing device as a basis for executing certain computing functions of one or more applications on the computing device. In one embodiment, for a received verbal input of "Navigate to Grand Central Station by public transportation," the computing device may divide the input into three different types of natural language information. First, a request for the navigation application is received, and the computing device may responsively open the navigation application (selection of an application on the computing device). Second, a request to navigate from a current location to a new location is received (an action within the navigation application). Third, a request of the target location as Grand Central Station is received (a parameter within the navigation application) and that the transportation mode be public transportation (a parameter within the navigation application).

The computing device may accumulate data on each verbal input received into the user interface of the computing device. This data include at least a count of the number of times a particular textual phrase is obtained based on a given verbal input. In another embodiment, the data further include associating the count of the number of times a particular textual phrase is received with one of the three categories described above. Other embodiments are possible as well. Once the count of a given textual phrase exceeds a threshold number, the computing device may query an advertisement database for one or more advertisements relating to the given textual phrase. For example, if the count of a textual phrase relating to Grand Central Station exceeds the threshold, the computing device may display advertisements for businesses near Grand Central. If the count of a textual phrase relating to the navigation application exceeds the threshold, the computing device may display advertisements for navigation services or GPS devices. If the count of a textual phrase relating to public transportation exceeds the threshold, the computing device may display advertisements for additional applications relating to public transportation or businesses that provide public transportation. Biasing advertisements based on verbal inputs into computing devices may provide relevant advertisements on such devices, leading to a higher click-through rate and more valuable "screen real estate."

Figure 1:
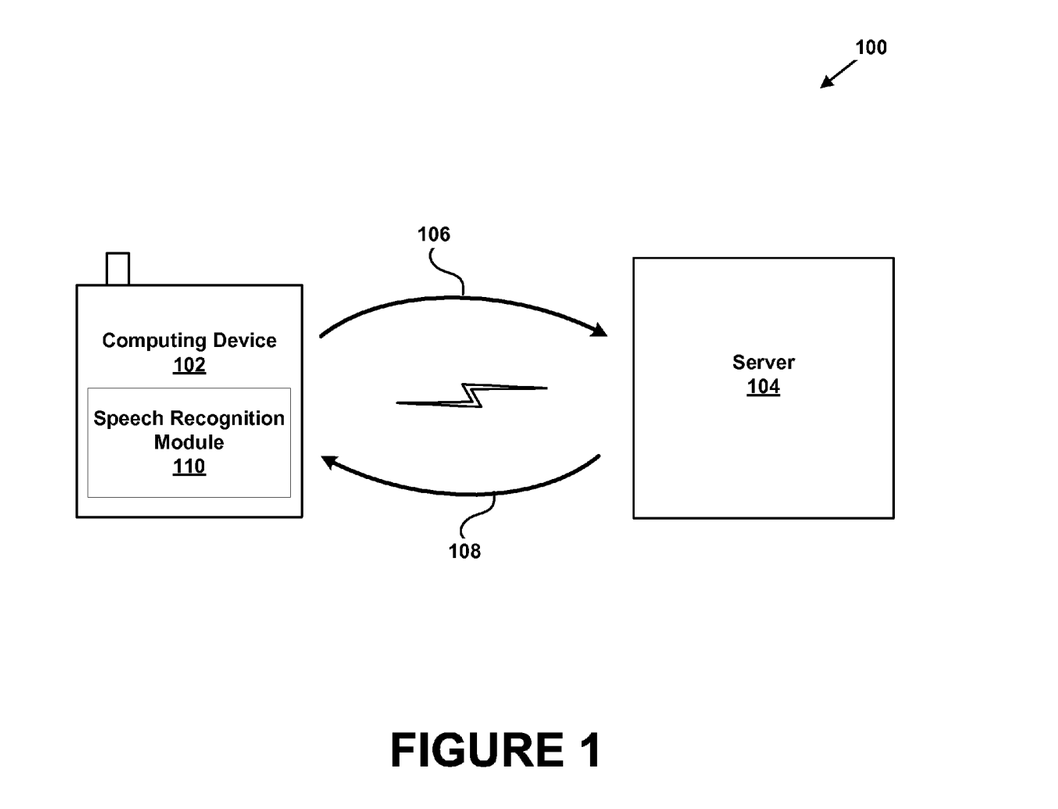
FIG. 1 illustrates an example communication system.

FIG. 1 illustrates an example communication system 100 in which an example method may be implemented. In FIG. 1, a computing device 102 may communicate with a server 104 via one or more wired and/or wireless interfaces. The computing device 102 and the server 104 may communicate within a network. Alternatively, the computing device 102 and the server 104 may each reside within a respective network.

The computing device 102 may be any type of computing device or transmitter including a laptop computer, a mobile telephone, or tablet computing device, etc., that is configured to transmit data 106 to or receive data 108 from the server 104 in accordance with the method and functions described herein. The computing device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs. In one embodiment, the computing device 102 may include a speech recognition module 110 which may be configured to process one or more verbal inputs received into the user interface of the computing device 102. In another embodiment, the server 104 may include the speech recognition module which may be configured to process the data 106 received from the computing device 102.

The server 104 may be any entity arranged to carry out certain steps of the method and computing device functions described herein. Further, the server 104 may be configured to send data 108 to or receive data 106 from the computing device 102.

The data 106 received by the server 104 from the computing device 102 may take various forms. In one embodiment, the computing device 102 may send an audio recording of one or more verbal inputs of a user of the computing device 102. The server 104 may then convert the audio to text and parse the text in order to identify one or more functions to perform. In another embodiment, the computing device 102 may convert the audio to text locally and then send the text information to the server 104 to be parsed. In yet another embodiment, the computing device 102 may parse the text locally, determine one or more functions to perform, execute the one or more functions, and send information indicative of the parsing, determining, and executing to the server 104. In another embodiment, the computing device 102 may parse the verbal input into categories. Such categories may include selection of a given application, an action within the given application, and one or more parameters of the action within the given application. In still another embodiment, the computing device 102 may accumulate and store data on each textual phrase corresponding to each received verbal input. In another embodiment, such data is stored on the server 104. Other embodiments are also possible.

The data 108 sent to the computing device 102 from the server 104 may take various forms. In one embodiment, the server 104 may receive a verbal input, and determine a function to be carried out by the computing device 102. In another embodiment, the server 104 may parse the verbal input into categories. Such categories may include selection of a given application, an action within the given application, and one or more parameters of the action within the given application. In yet another embodiment, the data 108 sent to the computing device 102 from the server 104 may contain an advertisement stored in an advertisement database in the server 104. Other embodiments are also possible.

Figure 2:
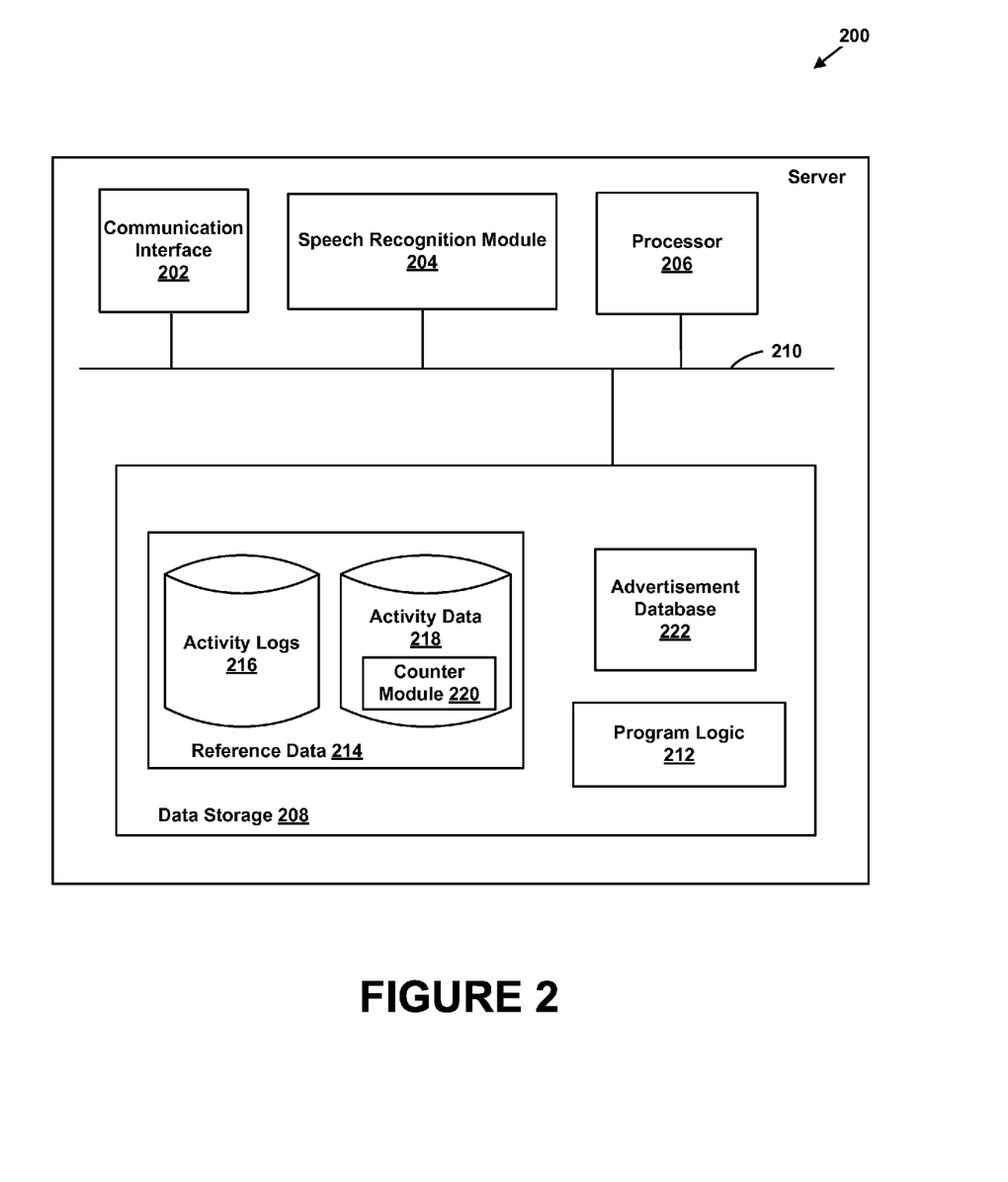
FIG. 2 illustrates a schematic drawing of an example server.

FIG. 2 illustrates a schematic drawing of an example server 200. In one example, the server 200 may be the server 104 shown in FIG. 1. In some examples, some components illustrated in FIG. 2 may be distributed across multiple servers. However, for the sake of example, the components are shown and described as part of one example server 200. The server 200 may be a computing device, a component of a cloud, or similar entity that may be configured to perform the functions described herein.

The server 200 may include a communication interface 202, a speech recognition module 204, a processor 206, and data storage 208. All of the components illustrated in FIG. 2 may be linked together by a communication link 210. The server 200 may also include hardware to enable communication within the server 200 and between the server 200 and another computing device (not shown). The hardware may include transmitters, receivers, and antennas, for example.

The communication link 210 is illustrated as a wired connection; however, wireless connections may also be used. For example, the communication link 210 may be a wired serial bus such as a universal serial bus or a parallel bus. A wired connection may be a proprietary connection as well. The communication link 210 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. One or more remote computing devices may be accessible via the Internet and may include a computing cluster associated with a particular web service (e.g., social-networking, photo sharing, address book, etc.).

The communication interface 202 may allow the server 200 to communicate with another computing device (not shown), such as a mobile phone, personal computer, etc. Thus, the communication interface 202 may be configured to receive input data from one or more computing devices, and may also be configured to send output data to the one or more computing devices. In some examples, the communication interface 202 may also maintain and manage records of data received and sent by the server 200. In other examples, records of data may be maintained and managed by other components of the server 200.

The speech recognition module 204, which may also have functionality of a text recognition module, may be configured to parse a received verbal input into one or more textual phrases and provide the textual phrase to an appropriate application on a computing device. In some examples, speech recognition may be performed locally on a computing device, as discussed below.

The data storage 208 may store program logic 212 that can be accessed and executed by the processor 206 to perform method steps described in relation to later figures. The data storage 208 may also store reference data 214 and an advertisement database 222. The server 200 may be configured to access the reference data 214 upon receiving a verbal input from a computing device. The reference data 214 may include activity logs 216 received from one or more computing devices, and activity data 218 determined based on comparisons made between stored activity logs 216. In some examples, the activity data 218 may include a counter module 220. The counter module 220 may include a counter value indicative of a number of occurrences of a correlation between an input received from the computing device and previously stored inputs. The counter module 220 may be configured to increment the counter value based at least in part on the number of occurrences. In some examples, one or more functions of the server 200 may be inhibited by the counter module 220 when the counter value is less than, or exceeding, a threshold. Other activity data is possible as well, as discussed below in reference to later figures.

In one example, the server 200 may receive an activity log from a computing device, as discussed below. The activity log may include a verbal input. The activity log may further include a determined function, or information indicating the determined function. In one example, the verbal input may indicate a request made by a user of the computing device for a specific application (e.g., opening a navigation application). In another example, the verbal input may indicate a request made by the user to take a specific action within a specific application as well as various parameters of that specific action (e.g., requesting directions from a current location to Grand Central Station using public transportation in a navigation application).

In one embodiment, after receiving the activity log, the server 200 may access the reference data 214 in order to compare the received activity log with one or more stored activity logs 216. By comparing the one or more stored activity logs 216 with the received activity log, the server 200 may accumulate activity data 218 relating to the verbal inputs received. The activity data 218 may include a count of the number of times a particular verbal input is received. Other embodiments are also possible as discussed below.

The advertisement database 222 may contain advertisements separated by several categories. In one embodiment, the advertisements are configured for interaction with the user. The advertisements stored in the advertisement database 222 may be video advertisements, audio advertisements, or graphical advertisements. Other embodiments are possible as well.

Figure 3:
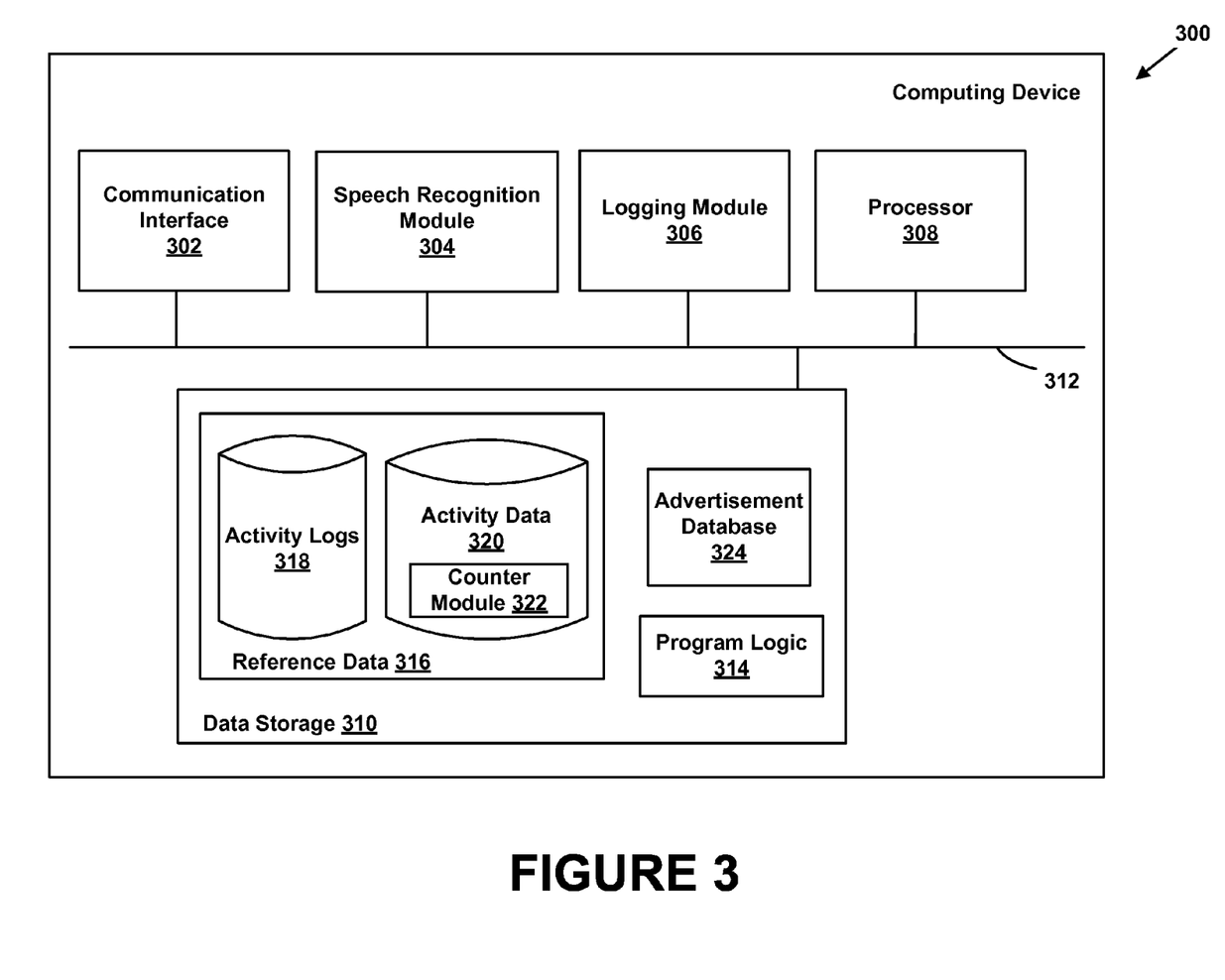
FIG. 3 illustrates a schematic drawing of an example computing device.

FIG. 3 illustrates a schematic drawing of an example computing device 300. In some examples, the computing device 300 may be the computing device 102 shown in FIG. 1. In some embodiments, some components illustrated in FIG. 3 may be distributed across multiple computing devices. However, for the sake of example, the components are shown and described as part of one example computing device 300. The computing device 300 may be a mobile device, desktop computer, email/messaging device, tablet computer, or similar device that may be configured to perform the functions described herein.

The computing device 300 may include a communication interface 302, a speech recognition module 304, a logging module 306, a processor 308, and data storage 310. All of the components illustrated in FIG. 3 may be linked together by a communication link 312. The computing device 300 may also include hardware to enable communication within the computing device 300 and between the computing device 300 and another computing device (not shown), such as a server entity. The hardware may include transmitters, receivers, and antennas, for example.

The communication link 312 is illustrated as a wired connection; however, wireless connections may also be used. For example, the communication link 312 may be a wired serial bus such as a universal serial bus or a parallel bus. A wired connection may be a proprietary connection as well. The communication link 312 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. One or more remote computing devices may be accessible via the Internet and may include a computing cluster associated with a particular web service (e.g., social-networking, photo sharing, address book, etc.).

The communication interface 302 may allow the computing device 300 to communicate with another computing device (not shown), such as a server. Thus, the communication interface 302 may be configured to receive input data from one or more computing devices, and may also be configured to send output data to the one or more computing devices. In some examples, the communication interface 302 may also maintain and manage records of data received and sent by the computing device 300. In other examples, records of data may be maintained and managed by other components of the computing device 300.

The speech recognition module 304 may be configured to perform speech recognition functions locally at the computing device 300, similar to the speech recognition module 204 described in FIG. 2. It should be understood, that the functions performed by the speech recognition module 304 may be divided between the computing device 300 and one or more servers in a particular network. However, strictly client-side and/or purely server-side run-time functions are possible as well. The speech recognition module 304 may be configured to parse a received verbal input into a textual phrase and provide the textual phrase to an appropriate application on the computing device 300. The speech recognition module 304 may perform speech recognition using a variety of techniques, such as by use of finite state machines, algorithms, or other techniques known by those having ordinary skill in the art.

After parsing the verbal input into a textual phrase, the speech recognition module 304 may send an output comprising a record of the verbal input and the resulting textual phrase to the logging module 306 configured to store the output received from the speech recognition module 304. The data stored by the logging module 306 may include the verbal input, the corresponding textual phrase, and the application at which that the verbal input was directed. Other examples of data stored by the logging module 306 are possible as well. In some embodiments, the logging module 306 may store data locally at the computing device 300. In other embodiments, the logging module 306 may store data remotely at another computing device.

The data storage 310 may store program logic 314 that can be accessed and executed by the processor 308 to perform method steps described in relation to later figures. The data storage 310 may also store reference data 316 and an advertisement database 324. The computing device 300 may be configured to access the reference data 316 upon receiving a verbal input. The reference data 316 may include activity logs 318 received from the logging module 306, and activity data 320 determined based on comparisons made between stored activity logs 318. The activity data 320 may include a counter module 322. The counter module 322 may include a counter value indicative of a number of occurrences of a correlation between an input received from the computing device and previously stored inputs. The counter module 322 may be configured to increment the counter value based at least in part on the number of occurrences. In some examples, one or more functions of the computing device 300 may be inhibited by the counter module 322 when the counter value is less than, or exceeding, a threshold. Other activity data is possible as well, as discussed below in reference to later figures.

In one embodiment, the logging module 306 may send data from the logging module 306 to the activity log of a server to compare the logging module data with one or more stored activity logs. In another embodiment, the logging module may locally send its data to activity logs 318 located on the computing device 300 itself. By comparing the one or more stored activity logs 318 with the received data from the logging module 306, the computing device 300 may locally accumulate activity data 320 relating to the textual phrase corresponding to the verbal inputs received. The activity data 320 may include a count of the number of times a particular textual phrase is received. Other embodiments are also possible as discussed below.

The data storage 310 of the computing device 300 may also contain a locally stored advertisement database 324. Similar to the advertisement database discussed above in relation to FIG. 2, the locally stored advertisement database 324 may contain advertisements separated by several categories. In one embodiment, the advertisements are configured for interaction with the user. The advertisements stored in the advertisement database 324 may be video advertisements, audio advertisements, or graphical advertisements. In one embodiment, the advertisements are stored onto the computing device 300. Other embodiments are possible as well.

Figure 4:
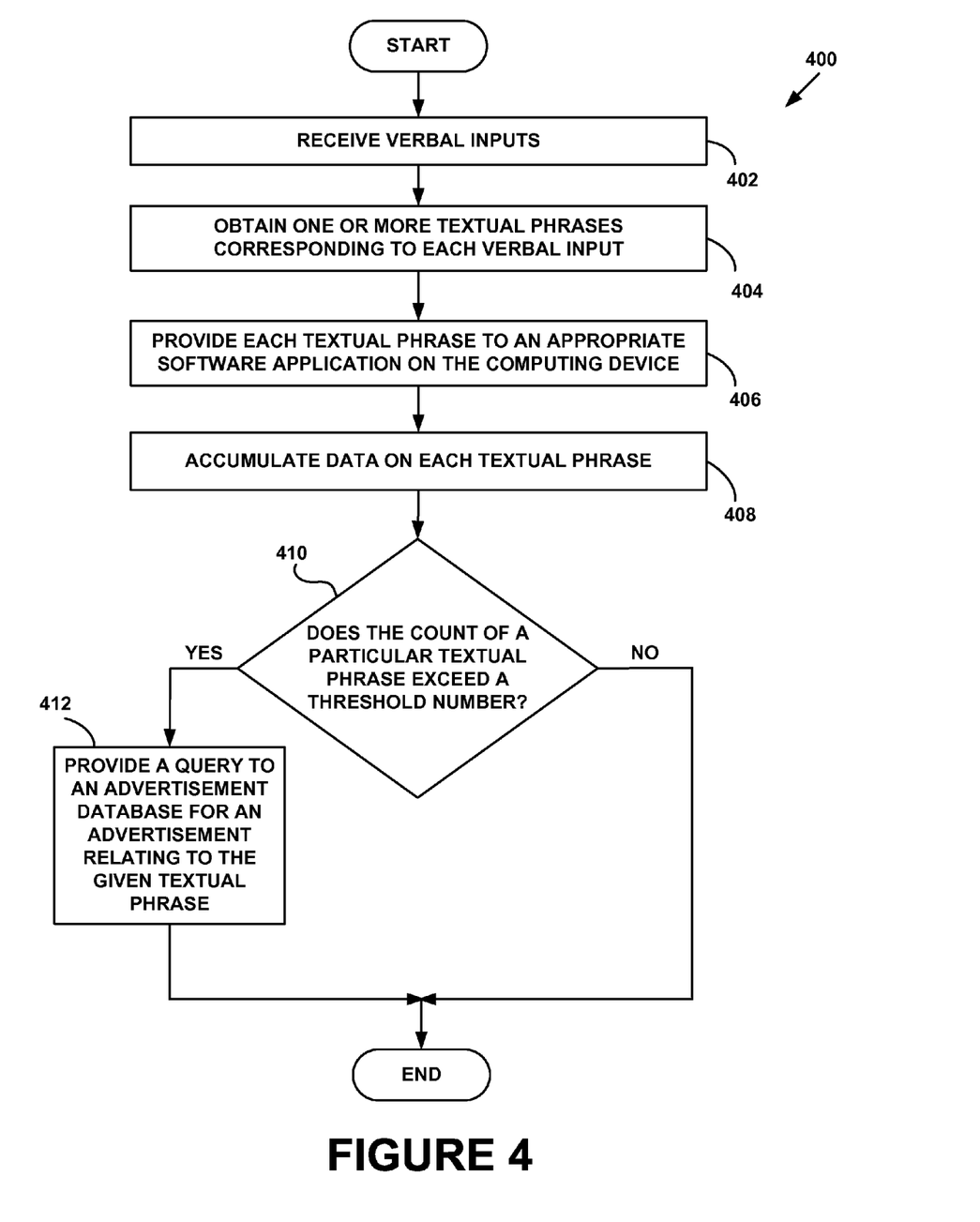
FIG. 4 depicts a flow chart of an example method.

FIG. 4 depicts a flowchart of an example method, which in some examples, may be performed by components of the system 100 in FIG. 1, by the server 200 in FIG. 2, and/or by the computing device 300 in FIG. 3. Method 400 may include one or more operations, functions, or actions as illustrated by one or more of blocks 402-412. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

For the sake of example, the method shown in FIG. 4 will be described as implemented by a computing device. It should be understood that other entities, such as one or more servers, can implement one or more steps of the example method.

At block 402, the method 400 includes receiving verbal inputs. The verbal inputs may be spoken by a user and received by an operating system of a computing device. A user interface of the computing device may include a microphone to receive the verbal inputs. In one embodiment, the verbal inputs are directed at one or more applications configured to be executed on the computing device. The one or more applications may be configured to perform functions based on the received verbal inputs.

At block 404, the method 400 includes obtaining one or more textual phrases corresponding to each verbal input. In one embodiment, a speech recognition module on the computing device is configured to parse a received verbal input into one or more textual phrases. The speech recognition module may perform speech recognition using a variety of techniques, such as by use of finite state machines, algorithms, or other techniques known by those having ordinary skill in the art. It should be understood, that the functions performed by the speech recognition module may be divided between the computing device and one or more servers in a particular network. Thus, in one example, the computing device may send the verbal input (or a recording of the verbal input) to a server and request a speech-to-text translation from the server. However, strictly client-side and/or purely server-side run-time functions are possible as well.

At block 406, the method 400 includes providing each textual phrase to an appropriate application on the computing device. In one embodiment, once the speech recognition module on the computing device parses a received verbal input into one or more textual phrases, the speech recognition module may provide the textual phrases to an appropriate application on the computing device. In one embodiment, the user speaks a verbal input from a home screen on the computing device. In such an embodiment, the speech recognition module of the computing device can determine which application on the computing device should be provided with the textual phrase corresponding to the verbal input.

In one embodiment, each application on the computing device has a list of textual phrases with which that application is associated. For example, a navigation application may be associated with the textual phrases "navigate to," "directions to," and "where is" as examples. When a user speaks the verbal input "Navigate to Grand Central Station" from a home screen of the computing device, the speech recognition module will provide the textual phrases to the navigation application since the phrase "navigate to" is associated with the navigation application. As another example, a calendar application may be associated with the textual phrases "remind me," "set an appointment," and "meeting at" as examples. When a user speaks the verbal input "Set an appointment for one o'clock P.M." from the home screen of the computing device, the speech recognition module will provide those textual phrases to the calendar application since the phrase "set an appointment" is associated with the calendar application. Other embodiments are possible as well.

In another embodiment, the user speaks a verbal input while the computing device is operating an application on the computing device. In such an embodiment, the speech recognition module provides the corresponding textual phrase to the application which currently operating on the computing device. For example, the computing device may be operating a navigation application. The user may speak the verbal input "Go to Grand Central Station." Since the computing device is operating the navigation application, the textual phrases corresponding to the verbal input will be provided to the navigation application. Other embodiments are possible as well.

At block 408, the method 400 includes accumulating data on each textual phrase. In one embodiment, data is accumulated locally in the data storage of the computing device. In another embodiment, data is accumulated in the data storage of another computing device, such as a server.

After parsing a verbal input into one or more textual phrases and providing the textual phrases to an appropriate application on the computing device, the speech recognition module may send an output comprising a record of the verbal input and the resulting textual phrases to a logging module on the computing device configured to store the output received from the speech recognition module. The data stored by the logging module may include the verbal input received, the corresponding textual phrases, and the application to which the textual phrases were provided. Other examples of data stored by the logging module are possible as well.

The reference data of the computing device may include activity logs received from the logging module, and activity data (hereinafter "data") determined based on comparisons made between stored activity logs. The data may be determined by a counter module. The counter module may include a counter value indicative of a number of occurrences of a correlation between a textual phrase received from the computing device and previously stored textual phrases. The counter module may be configured to increment the counter value based at least in part on the number of occurrences. In some examples, one or more functions of the computing device may be inhibited by the counter module when the counter value is less than a threshold.

The counter module may maintain a count of the number of times a particular textual phrase is determined based on a given received verbal input. For example, the user may speak the verbal input "Navigate to Grand Central Station by public transportation" into the computing device. This verbal input includes the textual phrases "navigate," "Grand Central Station," and "public transportation." The counter module of the computing system would then add one count to the textual phrase "navigate," one count to the textual phrase "Grand Central Station," and one count to the textual phrase "public transportation." As another example, the user may speak the verbal command "Restaurants near Grand Central Station." This verbal input also includes the textual phrase "Grand Central Station." The counter module of the computing system would add another count to the textual phrase "Grand Central Station." As the user continues to provide verbal inputs to the computing device, the counter module continues to count the number of occurrences of each textual phrase across all applications on the computing device. That is, no matter what application the textual phrases are provided or directed to, the counter module will keep a count of the number of occurrences of each textual phrase.

Other examples of data accumulated by the data storage of the computing device are possible as well. In one embodiment, the geographic location of the computing device at the time of receiving each verbal input may be stored on the computing device and associated with the received verbal input. The geographic location of the computing device may be determined by a GPS system located on the computing device. In another embodiment, a timestamp including the date and time of day at the time of receiving each verbal input may be stored on the computing device and associated with the verbal input. Other embodiments are possible as well.

In one embodiment, textual phrases corresponding to a verbal input may be processed into three categories: (1) the selection of an application on the computing device, (2) an action within that application, and (3) one or more parameters of the action within that application. For example, for a received verbal input of "Navigate to Grand Central Station by public transportation," the computing device may divide the input into three different types of natural language information. First, a request for the navigation application is received, and the computing device may responsively open the navigation application (selection of an application on the computing device). Second, a request to navigate from a current location to a new location is received (an action within the navigation application). Third, a request of the target location as Grand Central Station is received (a parameter within the navigation application) and that the transportation mode be public transportation (a parameter within the navigation application). The computing device may then accumulate data on the application opened, the action requested, and the parameter values filled in. For example, the counting module of the computing device may keep a count of the number of times the navigation application is requested. Other embodiments are possible as well.

At block 410, the method 400 includes determining whether the count of a particular textual phrase exceeds a threshold number. The counter module of the computing device may make this determination. In one embodiment, the threshold may be determined by an application developer. In another embodiment, the threshold may be determined by the operating system developer. Other embodiments are possible as well. Example thresholds values include 5, 10, 20, or more. In other examples, thresholds may vary over time, or may be reset or lowered over time as well.

If it is determined that the count of a particular textual phrase exceeds a threshold number, the method 400 continues at block 412 with providing a query corresponding to the textual phrase to an advertisement database for one or more advertisements relating to the textual phrase. The querying may be done by the computing device, or in another embodiment, the querying may be done by an external server. In one embodiment, the advertisement database is located on the computing device. In another embodiment, the advertisement database is located on an external server. The advertisements stored in the advertisement database may be video advertisements, audio advertisements, textual advertisements, or graphical advertisements. Other embodiments are possible as well.

The advertisement database may contain advertisements separated by various textual phrases. For example, several advertisements relating to the textual phrase "Navigate" may be stored together. Therefore, if it is determined that the count of the textual phrase "Navigate" exceeds a threshold number, the processor of the computing device may query the advertisement database for an advertisement relating to "Navigate." The advertisement database may randomly select one of the several advertisements relating to the textual phrase "Navigate" to serve to the display of the computing device. For example, advertisements relating to other navigation applications or GPS devices may be displayed.

In another embodiment, the advertisement database may contain advertisements separated by geographic location. For example, advertisements for businesses near Grand Central Station may be stored together. Therefore, if it is determined that the count of the textual phrase "Grand Central Station" exceeds a threshold number, the processor of the computing device may query the advertisement database for an advertisement for a business geographically near Grand Central Station. The advertisement database may randomly select one of the several advertisements for businesses near Grand Central Station to serve to the display of the computing device. For example, advertisements for restaurants or shops near Grand Central Station may be displayed. Other embodiments are possible as well.

In one embodiment, the advertisements may be stored on the computing device. These advertisements may then be served by the computing device when a received voice input corresponds to a textual phrase having a count exceeding the threshold. In another embodiment, the advertisements are requested dynamically and are served via the internet. Other embodiments are possible as well.

In one embodiment, the advertisements are displayed within an application of the computing device. In another embodiment, an option to view one or more advertisements may be displayed to the user. For example, a "see related offers" button or link may be displayed inside of an application, web page, text message or email. In another example, the user may reach "related offers" via the settings menu of the computing device or some other drop down menu. Other embodiments are possible as well.

In yet another embodiment, the advertisements are configured for interaction with the user. For example, the advertisement may display a button or link directing the user to a website. The computing device may process user interaction with the advertisements and store such interaction in the data storage of the computing device.

Figure 5A:
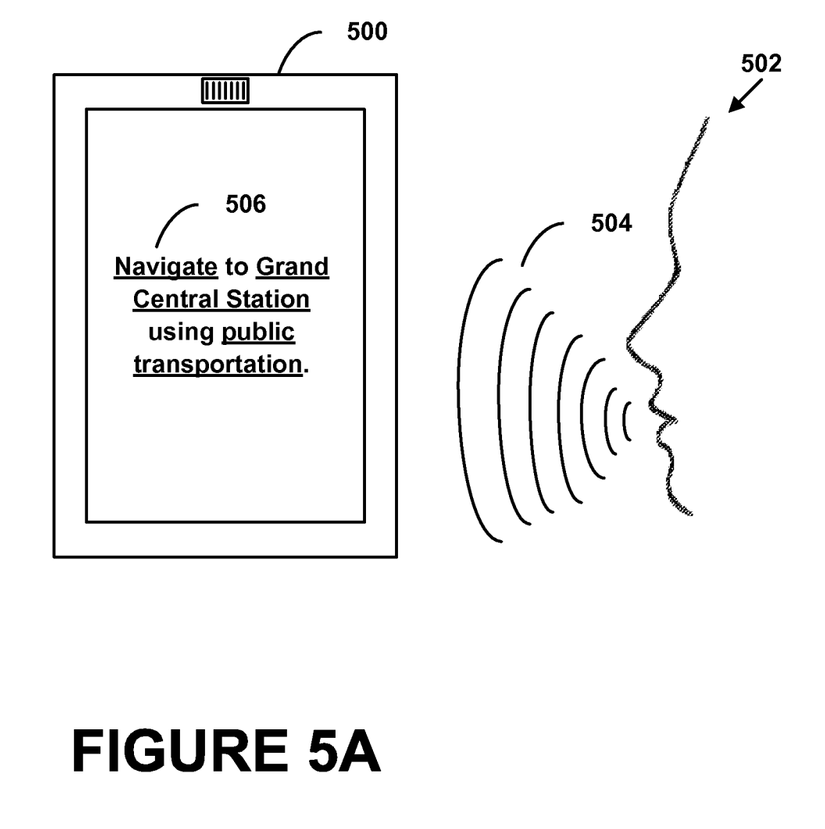
FIGS. 5A-5B illustrate example computing devices performing functions in accordance with an example method.
Figure 5B:
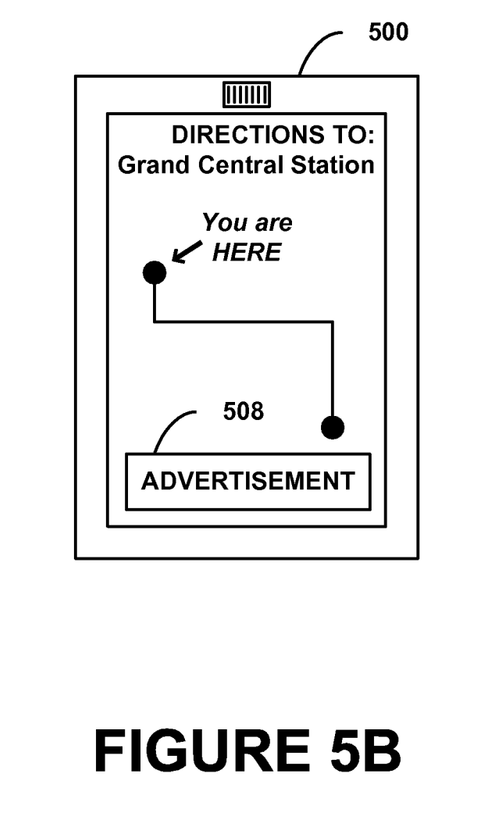

FIGS. 5A-5B illustrate example computing devices performing functions in accordance with an example method. For the illustrated examples, the computing device 500 contains all of the features of the computing device described in FIG. 3. However, it should be understood that the computing device may take other forms and/or may include components different than those illustrated in FIG. 3.

FIG. 5A illustrates a user 502 of a computing device 500 providing a verbal input 504 to the computing device 500. The speech recognition module (which is located locally at the computing device 500, for this example) may parse the verbal input 504 into to one or more textual phrases 506 representative of one or more utterances of the user 502 of the computing device 500. The verbal input 504 illustrated in FIG. 5A, "Navigate to Grand Central Station by public transportation," may be classified into natural language categories, as discussed above. The logging module of the computing device 500 may store an activity log comprising the verbal input 504, information indicative of the parsing of the input instruction, and a count of the number of times a particular textual phrase is determined based on a given received verbal input. Other information may be stored as well.

FIG. 5B illustrates a determined function based on the verbal input 504. FIG. 5B also illustrates an advertisement 508 displayed according to an example method. If the user 502 regularly uses the navigation application (e.g., the count of a textual phrase corresponding to the navigation application exceeds a threshold number), the advertisement 508 may be related to navigation services or even GPS devices. If the user 502 regularly goes to Grand Central Station, the advertisement 508 may be related to businesses near Grand Central Station. If the user 502 regularly uses public transportation, the advertisement 508 may be related to applications or businesses that provide public transportation. The advertisement 508 may be a video advertisement, audio advertisement, textual advertisement, or graphical advertisement. Further, the advertisement 508 may be a "see related offers" button or link. As shown in FIG. 5B, the advertisement 508 is displayed in the application. However, in other embodiments the advertisement may be displayed on the home page of the computing device, a web page, a text message or an email. Other embodiments are possible as well.

Figure 6:
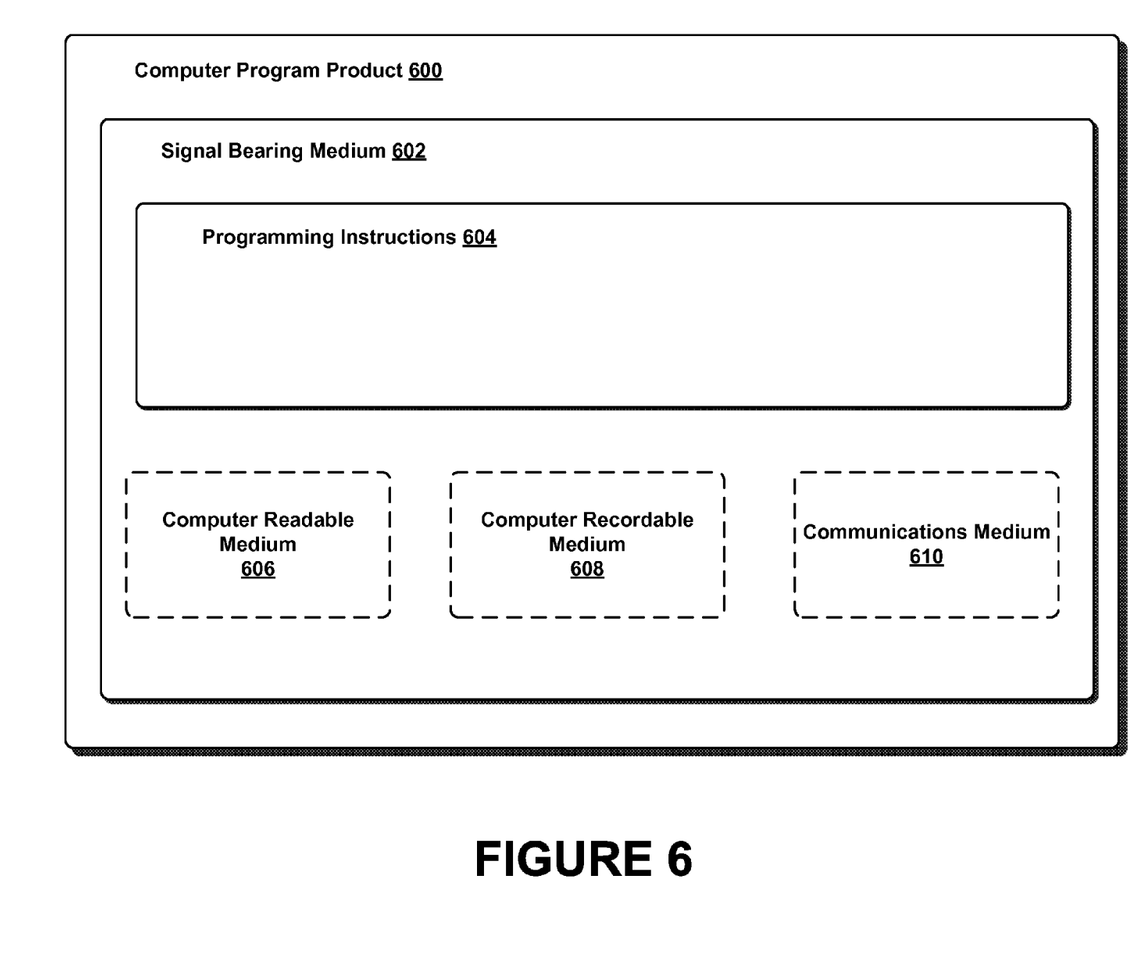
FIG. 6 depicts a computer-readable medium configured according to an example embodiment.

FIG. 6 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed methods can be implemented by computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5B. In some examples, the signal bearing medium 602 can be a computer-readable medium 606, such as, but not limited to, a hard disk drive, a Compact Disc (CD), a Digital Video Disk (DVD), a digital tape, memory, etc. In some implementations, the signal bearing medium 602 can be a computer recordable medium 608, such as, but not limited to, memory, read/write (R/W) CDs, R/W DVDs, etc. In some implementations, the signal bearing medium 602 can be a communications medium 610, such as, but not limited to, a digital and/or an analog communication medium (e.g., a fiber optic cable, a waveguide, a wired communications link, a wireless communication link, etc.). Thus, for example, the signal bearing medium 602 can be conveyed by a wireless form of the communications medium 610.

The one or more programming instructions 604 can be, for example, computer executable and/or logic implemented instructions. In some examples, a computing device such as the processor 308 of FIG. 3 is configured to provide various operations, functions, or actions in response to the programming instructions 604 conveyed to the processor 308 by one or more of the computer-readable medium 606, the computer recordable medium 608, and/or the communications medium 610.

The non-transitory computer-readable medium could also be distributed among multiple data storage elements, which could be remotely located from each other. The device that executes some or all of the stored instructions could be a client-side computing device as illustrated in FIG. 3. Alternatively, the device that executes some or all of the stored instructions could be a server-side computing device, such as a server as illustrated in FIG. 2.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

We claim:

1. A method comprising:
receiving by a computing device, a verbal input, wherein the computing device includes one or more applications configured to execute on the computing device and to perform functions based on the received verbal input;
obtaining one or more textual phrases corresponding to the received verbal input;
processing the one or more textual phrases into categories, wherein the categories comprise: (a) selection of a given application on the computing device, (b) an action within the given application, and (c) one or more parameters of the action within the given application;
providing the one or more textual phrases to a given application on the computing device;
accumulating data on the one or more textual phrases, wherein the accumulated data comprises at least a count of a number of times a particular textual phrase is obtained based on a given received verbal input, wherein the accumulated data further comprises associating the count of the number of times a particular textual phrase is obtained with a corresponding category, and wherein the data is representative of textual phrases provided to the one or more applications on the computing device;
based on the count of a given textual phrase for one of the categories exceeding a threshold, providing a query corresponding to the textual phrase, wherein the query is usable to search an advertisement database for one or more advertisements relating to the textual phrase.

2. The method of claim 1, further comprising:
storing the one or more advertisements on the computing device; and
providing the one or more advertisements when a received verbal input corresponds to the given textual phrase.

3. The method of claim 1, further comprising:
in response to the query, receiving the one or more advertisements relating to the given textual phrase; and
displaying the one or more advertisements within an application of the computing device.

4. The method of claim 1, further comprising displaying an option to view the one or more advertisements relating to the given textual phrase.

5. The method of claim 1, further comprising receiving a message on the computing device containing a link to the one or more advertisements, wherein the message includes a text message or an email.

6. The method of claim 1, wherein the advertisement database is located on the computing device.

7. The method of claim 1, wherein the advertisement database is located on an external server.

8. The method of claim 1, wherein the accumulated data further comprises a geographic location of the computing device when receiving the verbal input.

9. The method of claim 1, wherein the accumulated data further comprises a timestamp when receiving the verbal input, wherein the timestamp comprises a date and a time of day.

10. The method of claim 1, wherein the one or more advertisements are configured for interaction with a user, and the method further comprises processing user interaction with the one or more advertisements displayed on the computing device.

11. A computing device comprising:
at least one processor;
data storage comprising program logic executable by the at least one processor to perform functions comprising:
receiving by a computing device, a verbal input, wherein the computing device includes one or more applications configured to execute on the computing device and to perform functions based on the received verbal input;
obtaining one or more textual phrases corresponding to the received verbal input;
processing the one or more textual phrases into categories, wherein the categories comprise: (a) selection of a given application on the computing device, (b) an action within the given application, and (c) one or more parameters of the action within the given application;
providing the one or more textual phrases to a given application on the computing device;
accumulating data on the one or more textual phrases, wherein the accumulated data comprises at least a count of a number of times a particular textual phrase is obtained based on a given received verbal input, wherein the accumulated data further comprises associating the count of the number of times a particular textual phrase is obtained with a corresponding category, and wherein the data is representative of textual phrases provided to the one or more applications on the computing device;

based on the count of a given textual phrase for one of the categories exceeding a threshold, providing a query corresponding to the textual phrase, wherein the query is usable to search an advertisement database for one or more advertisements relating to the textual phrase.

12. The computing device of claim 11, wherein the program logic is further executable by the at least one processor to carry out the functions of:

storing the one or more advertisements on the computing device; and providing the one or more advertisements when a received verbal input corresponds to the given textual phrase.

13. The computing device of claim 11, wherein the program logic is further executable by the at least one processor to carry out the functions of:

in response to the query, receiving the one or more advertisements relating to the given textual phrase; and displaying the one or more advertisements within an application of the computing device.

14. The computing device of claim 11, wherein the program logic is further executable by the at least one processor to carry out the function of displaying an option to view the one or more advertisements relating to the given textual phrase.

15. The computing device of claim 11, wherein the advertisement database is located on the computing device.

16. The computing device of claim 11, wherein the advertisement database is located on an external server.

17. A computer-readable memory having stored thereon instructions, that when executed by a computing device, cause the computing device to carry out functions comprising:

receiving by a computing device, a verbal input, wherein the computing device includes one or more applications configured to execute on the computing device and to perform functions based on the received verbal input;

obtaining one or more textual phrases corresponding to the received verbal input;

processing the one or more textual phrases into categories, wherein the categories comprise: (a) selection of a given application on the computing device, (b) an action within the given application, and (c) one or more parameters of the action within the given application;

providing the one or more textual phrases to a given application on the computing device;

accumulating data on the one or more textual phrases, wherein the accumulated data comprises at least a count of a number of times a particular textual phrase is obtained based on a given received verbal input, wherein the accumulated data further comprises associating the count of the number of times a particular textual phrase is obtained with a corresponding category, and wherein the data is representative of textual phrases provided to the one or more applications on the computing device;

based on the count of a given textual phrase for one of the categories exceeding a threshold, providing a query corresponding to the textual phrase, wherein the query is usable to search an advertisement database for one or more advertisements relating to the textual phrase.

18. The computer-readable memory of claim 17, wherein the functions further comprise:

storing the one or more advertisements on the computing device; and providing the one or more advertisements when a received verbal input corresponds to the given textual phrase.

* * * * *